(12) United States Patent
Kismarton (10) Patent No.: US 8,201,371 B2
(45) Date of Patent: *Jun. 19, 2012

(54) COMPOSITE BEAM CHORD BETWEEN REINFORCEMENT PLATES

(75) Inventor: Max U. Kismarton, Renton, WA (US)

(73) Assignee: The Boeing Company, Chicago, IL (US)

( * ) Notice: Subject to any disclaimer, the term of this patent is extended or adjusted under 35 U.S.C. 154(b) by 130 days.

This patent is subject to a terminal disclaimer.

(21) Appl. No.: 12/777,250

(22) Filed: May 10, 2010

(65) Prior Publication Data

US 2010/0219294 A1 Sep. 2, 2010

Related U.S. Application Data

(63) Continuation-in-part of application No. 11/096,743, filed on Mar. 31, 2005, now Pat. No. 7,721,495, and a continuation-in-part of application No. 12/340,631, filed on Dec. 19, 2008, now Pat. No. 7,807,249, which is a continuation-in-part of application No. 11/096,727, filed on Mar. 31, 2005, now abandoned.

(51) Int. Cl.
*E04C 1/00* (2006.01)

(52) U.S. Cl. ...... 52/309.16; 52/126.1; 52/578; 52/592.6; 248/188.2; 428/298.1; 428/299.1; 428/299.4; 428/105; 428/107

(58) Field of Classification Search ............... 52/126.1, 52/309.16, 578, 592.6, 831, 837, 841; 248/188.2; 428/298.1, 299.1, 299.4, 105, 107, 109, 113, 428/292.1, 293.1; 244/123, 119, 133; 442/218, 442/268, 269, 271, 277, 278

See application file for complete search history.

(56) References Cited

U.S. PATENT DOCUMENTS

| | | | |
|---|---|---|---|
| 3,768,760 A | 10/1973 | Jensen | |
| 3,975,916 A | 8/1976 | Watson | |
| 4,177,306 A * | 12/1979 | Schulz et al. | 428/107 |
| 4,734,146 A * | 3/1988 | Halcomb et al. | 156/148 |
| 4,741,943 A * | 5/1988 | Hunt | 428/113 |
| 5,064,439 A * | 11/1991 | Chang et al. | 264/255 |
| 5,429,326 A | 7/1995 | Garesche | |
| 5,735,486 A * | 4/1998 | Piening et al. | 244/124 |
| 5,866,272 A * | 2/1999 | Westre et al. | 428/593 |
| 6,114,050 A * | 9/2000 | Westre et al. | 428/608 |
| 6,355,337 B1 * | 3/2002 | Piening et al. | 428/223 |
| 6,355,584 B1 * | 3/2002 | Corrons | 442/367 |
| 6,565,944 B1 | 5/2003 | Hartness | |
| 6,641,893 B1 | 11/2003 | Suresh | |
| 6,703,118 B2 * | 3/2004 | van Weperen et al. | 428/295.4 |
| 2004/0213952 A1 * | 10/2004 | Takemura et al. | 428/105 |

* cited by examiner

*Primary Examiner* — Mark Wendell (57) ABSTRACT

A composite beam chord is between first and second reinforcement plates. The beam chord includes a first ply of reinforcing fibers with a fiber orientation of +α degrees with respect to a longitudinal axis of the beam chord and a second ply of reinforcing fibers with a fiber orientation of −α degrees with respect to the longitudinal axis. The angle α is between 2 and 12 degrees for suppression or delay of ply splitting.

22 Claims, 7 Drawing Sheets

COMPOSITE BEAM CHORD BETWEEN REINFORCEMENT PLATES

This is a continuation-in-part of U.S. Ser. No. 11/096,743 filed 31 Mar. 2005, now U.S. Pat. No. 7,721,495 and U.S. Ser. No. 12/340,631 filed 19 Dec. 2008, now U.S. Pat. No. 7,807,249. U.S. Ser. No. 12/340,631 is a continuation-in-part of U.S. Ser. No. 11/096,727 filed 31 Mar. 2005 and now abandoned.

FIELD

The present invention relates to composite material including reinforcing fibers.

BACKGROUND

Articles made of a composite material such as carbon fiber reinforced plastic (CFRP) may include multiple plies of reinforcing fibers at different fiber orientations. Reinforcing fibers in some plies may be oriented at zero degrees with respect to an axis of loading. The zero degree orientation provides strength in tension and compression. Reinforcing fibers in other plies may be oriented at other angles (+45 degrees, −45 degrees, 90 degrees) for shear and bearing strength.

Carbon fiber reinforced plastic may be used in place of metal, particularly in applications where relatively low weight and high mechanical strength are desirable. For instance, carbon fiber reinforced plastic is desirable for commercial and military aircraft.

SUMMARY

According to an embodiment herein, an article comprises a composite beam chord between first and second reinforcement plates. The beam chord includes a first ply of reinforcing fibers with a fiber orientation of $+\alpha$ degrees with respect to a longitudinal axis of the beam chord and a second ply of reinforcing fibers with a fiber orientation of $-\alpha$ degrees with respect to the longitudinal axis. The angle $\alpha=2$ to 12 degrees is used to suppress or delay ply splitting.

According to another embodiment herein, an article comprises first and second metal reinforcement plates, a composite beam chord between the first and second plates, and a plurality of fasteners extending through the beam chord for fastening the first and second plates to the beam chord. The beam chord includes a first ply of reinforcing fibers with a fiber orientation of $+\alpha$ degrees with respect to a longitudinal axis of the beam chord and a second ply of reinforcing fibers with a fiber orientation of $-\alpha$ degrees with respect to the longitudinal axis. Angle $\alpha=2$ to 12 degrees is used to suppress or delay ply splitting. The fasteners are perpendicular to the plies.

According to another embodiment herein, a method of manufacturing an article comprises fabricating a composite beam chord, including laying up plies of reinforcing fibers on a tool, wherein the fibers in at least some of the plies have an orientation of $\pm\alpha$ with respect to a uni-axial load bearing direction of the article, where $\alpha=2$ to 12 degrees. The method further includes forming through holes in the composite beam chord; and using the through holes to fasten reinforcement plates to opposite sides of the beam chord.

The features, functions, and advantages that have been discussed can be achieved independently in various embodiments of the present invention or may be combined in yet other embodiments further details of which can be seen with reference to the following description and drawings.

DETAILED DESCRIPTION

Figure 1A:
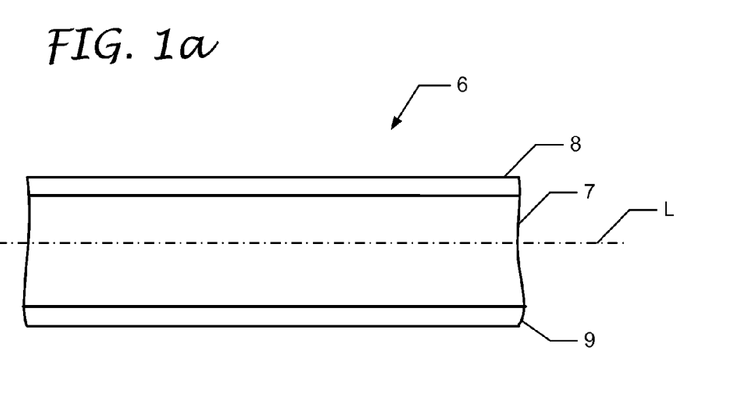
FIG. 1a is an illustration of an article including a composite beam chord between by reinforcement plates.

Reference is made to FIG. 1a, which illustrates an article 6 including a composite beam chord 7 between first and second reinforcement plates 8 and 9. The article 6 may be primarily uni-axially loaded along the axis L. The article 6 may also have some twist and transverse loading during usage.

The beam chord 7 is not limited to any particular geometry. In some embodiments, the beam chord 7 may have a solid cross-sectional shape such as rectangular, square, or I-beam shape. In other embodiments, the beam chord 7 may have a hollow cross-sectional shape such a round tubular or square tubular shape. In some embodiments, the beam chord 7 may be straight. In other embodiments, the beam chord 7 may be curved or/and tapered.

The beam chord 7 includes multiple plies of reinforcing fibers embedded in a matrix. A first ply of reinforcing fibers has a fiber orientation of $+\alpha$ degrees with respect to a longitudinal axis L of the beam chord 7, and a second ply of reinforcing fibers has a fiber orientation of $-\alpha$ degrees with respect to the longitudinal axis L, where $\alpha$ is between 2 and 12 degrees. The reinforcing fibers oriented at $\pm\alpha$ degrees provide strength in tension and compression along the axis L. The beam chord 7 has additional plies. Some embodiments of the beam chord 7 may have as few as three plies, while other embodiments may have hundreds or thousands of plies. In some embodiments, the additional plies also provide strength in tension and compression along the axis L. In other embodiments, some of the additional plies might be oriented in other directions to provide shear, transverse and bearing strength.

The reinforcement plates 8 and 9 serve several important functions. The reinforcement plates 8 and 9 provide protection against impact damage to the beam chord 7. The reinforcement plates 8 and 9 also improve load transfer properties. The reinforcement plates 8 and 9 also boost the compression strength of the composite plies by preventing impact damage.

Clamping the reinforcement plates 8 and 9 to the beam chord 7 suppresses delamination of the beam chord 7 (e.g., impact delamination at the free edge or normal impact at the face of the plies). This, in turn, prevents compressive sublaminate buckling.

When used for an aircraft keel beam, the reinforcement plates 8 and 9 provide additional benefits. These additional benefits, which will be discussed below, include acting as a grounding plane for electrical components and providing a current return path and a lightning strike energy path.

The reinforcement plates 8 and 9 may be made of any suitable material. In some embodiments, the reinforcement plates 8 and 9 may be made of a metal such as aluminum or titanium. In other embodiments, the reinforcement plates 8 and 9 may be carbon graphite plates. The reinforcement plates 8 and 9 may cover the entire surface of the beam chord 7 or only a portion of the beam chord 7.

The reinforcing fibers and matrix are not limited to any particular composition. Examples for the fibers include, but are not limited to, carbon, fiberglass, Kevlar, boron, or titanium. Examples of the matrix include, but are not limited to, plastic and metal. As a first example, carbon fibers are embedded in a plastic matrix. As a second example, carbon fibers are embedded in a titanium matrix. In some embodiments, the carbon fibers may be intermediate modulus carbon fibers (e.g., a modulus of 40 MSI).

Figure 1B:
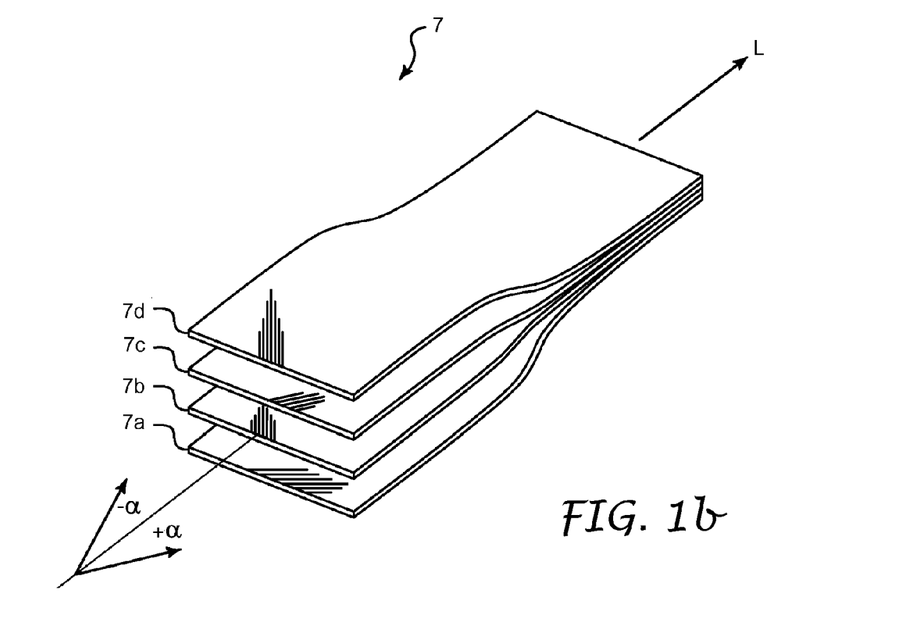
FIG. 1b is an illustration of a plurality of plies of a beam chord with fibers oriented at $\pm\alpha$ degrees.

FIG. 1*b* is an illustration of an arrangement of plies 7*a*-7*d* of the composite beam chord 7. The ply arrangement includes a first ply 7*a* of reinforcing fibers that are oriented at an angle +α degrees with respect to the longitudinal axis L, a second ply 7*b* of reinforcing fibers that are oriented at an angle −α degrees with respect to the longitudinal axis, a third ply 7*c* of reinforcing fibers that are oriented at an angle +α degrees, and a fourth ply 7*d* of reinforcing fibers that are oriented at an angle −α degrees. More generally, odd-numbered plies have reinforcing fibers oriented at +α degrees and even-numbered plies have reinforcing fibers oriented at −α degrees. Although FIG. 1*b* illustrates a beam chord 7 having four plies of fibers, the beam chord 7 is not so limited.

In some embodiments, each ply has fibers oriented in the same direction. In other embodiments, one or more of the plies may have fibers oriented at both angles +α and −α degrees. In some embodiments, different plies might have different values of α.

Different arrangements may be grouped together. For example, a beam chord 7 includes a plurality of fiber groups. The plies in each group correspond to an arrangement of fibers at different orientations. The groups may be applied in any desired combination and may be repeated to any desired degree.

To fasten the reinforcement plates 8 and 9 to the beam chord 7, holes may be formed in the beam chord 7, and fasteners inserted through the holes. These holes may be perpendicular to the plies and extend through the plies.

The article 6 is loaded uni-axially along the longitudinal axis L (e.g., the beam is placed in compression). The fibers oriented at ±α degrees suppress or delay ply splitting that would otherwise be caused by the holes. The splitting of a ply will be suppressed or delayed by a factor of 10 to 100 times relative to a laminate having a majority of fibers oriented at zero degrees. Replacing all zero degree plies with ±α plies boosts splitting resistance by 1 to 3 orders of magnitude, making such laminates far more practical.

Figure 2A:
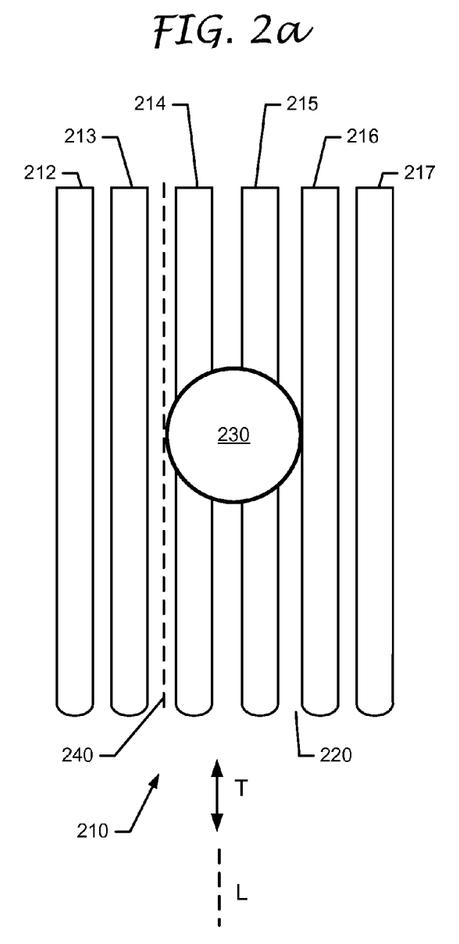
FIG. 2a is an illustration of fibers oriented at 0 degrees with respect to a longitudinal axis of a beam chord with a hole drilled in the middle.
Figure 2B:
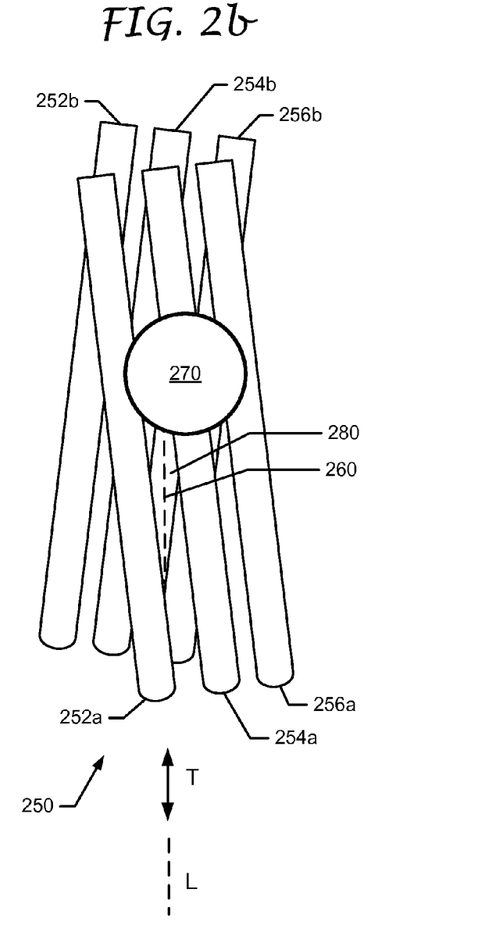
FIG. 2b is an illustration of fibers oriented at $\pm\alpha$ degrees with respect to a longitudinal axis of a beam chord with a hole drilled in the middle.

Reference is now made to FIGS. 2*a* and 2*b*, which illustrate matrix splitting for fibers oriented at zero degrees and ±α degrees, respectively. FIG. 2*a* illustrates a single ply 210 having six fibers 212-217 embedded in a matrix 220. The fibers 212-217 are oriented at 0 degrees with respect to axis L. Fibers 214 and 215 are cut by drilling a hole 230. When a tensile load is applied along axis L, the uncut fibers 212-213 and 216-217 carry the load and stretch. The cut fibers 214-215 do not carry the load, do not stretch, and are sheared away from the matrix 220. This, in turn, weakens the resin between a cut fiber 214 and an uncut fiber 213. A slender crack 240 (represented by the dash line) forms in the matrix 220 between the cut and uncut fibers 214 and 213. This crack 240 can propagate along the entire length of the ply 210. The crack 240 can occur whether an article has one ply, five plies, tens plies, or more. The crack 240 severely degrades the strength of the article.

FIG. 2*b* illustrates a layer 250 of fibers 252*a*-256*a* oriented at −α degrees with respect to axis L, and fibers 252*b*-256*b* oriented at +α degrees with respect to the axis L. The layer 250 may include a single ply having fibers 252*a*-256*a* and 252*b*-256*b* or two unidirectional plies (one unidirectional ply having fibers 252*a*-256*a* and another unidirectional ply having fibers 252*b*-256*b*). If fibers 254*a*, 256*a*, 254*b* and 256*b* are cut by a hole 270, a small crack 280 will form in the layer 250, but the crack 280 will not grow in an uncontrolled manner. Instead, growth of the crack 280 will slow and promptly stop, whereby strength of the article is retained. Moreover, due to the fiber orientation at ±α degrees, an ever increasing load will be needed to propagate the crack 280 (the angled fibers have been shown to diffuse the energy at the crack tip). Ply splitting is thus suppressed or delayed.

An angle α in the range of 2 to 8 degrees provides a good combination of strength and splitting suppression. For angles below 2 degrees, ply splitting increases rapidly. For angles α exceeding 8 degrees, axial strength drops off quickly. However, for some applications, angles up to 12 degrees will provide acceptable strength.

In some embodiments, an angle α in the range of 3-5 degrees provides a better combination of strength and splitting suppression/delay, and it also provides a margin of error against strength drop-off which can occur below α=2 degrees and above α=8 degrees (if fiber control is insufficient during fabrication, some fibers might be oriented at angles less than 2 degrees or greater than 8 degrees). An angle α of 3 degrees has been found to provide an even better combination, as it provides 1-2% more strength in compression.

However, the optimal value of α will usually be a function of several factors. These factors include, but are not limited to, the fiber, the matrix, interface bonding strength between a fiber and the matrix, fiber density, fiber length, etc. These factors also include the ability to control fiber orientation.

Some embodiments of the article 6 may only have reinforcing fibers oriented at angles of ±α degrees. That is, all fibers in the article 6 consist of reinforcing fibers at ±α degrees. In these embodiments, the reinforcing plates 8 and 9 provide strength and stiffness in at least one of shear, transverse and bearing.

In some embodiments of the article 6, the number of reinforcing fibers oriented at ±α degrees is at least 60% of the total number of reinforcing fibers in the composite beam chord. Those embodiments may also have reinforcing fibers oriented at angles other than ± α degrees to increase strength or stiffness in at least one of shear, transverse and bearing modes. As a first example, in existing structures, it is customary to add additional reinforcing fibers that are oriented at a conventional 45 degrees and 90 degrees.

Figure 3:
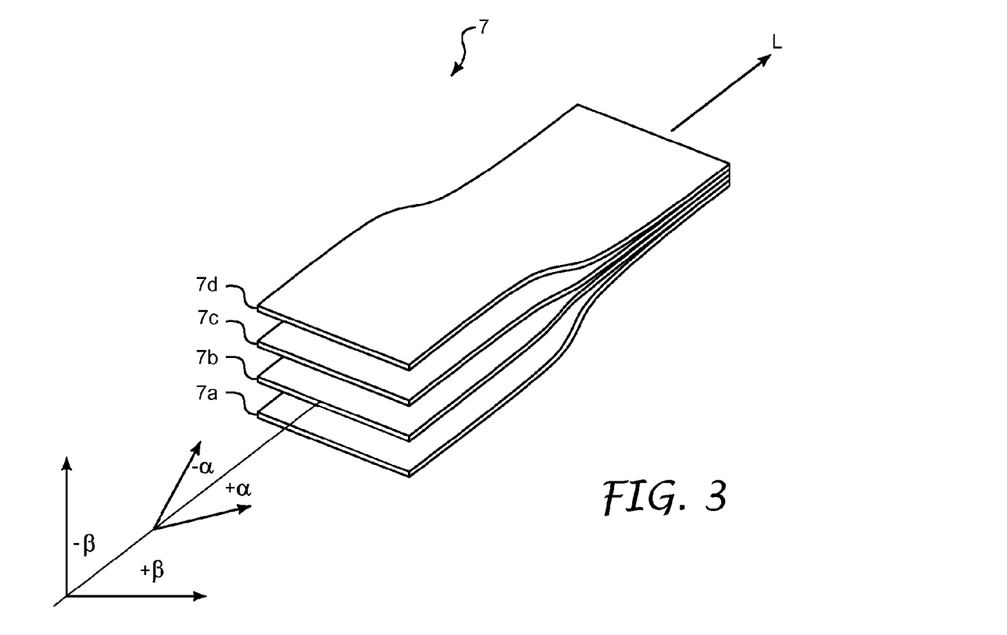
FIG. 3 is an illustration of a plurality of plies of a beam chord with fibers oriented at $\pm\alpha$ degrees and $\pm\beta$ degrees.

A second example is illustrated in FIG. 3. The ply arrangement illustrated in FIG. 3 includes first and second plies 7a and 7b having fibers oriented at +α and −α degrees. The ply arrangement further includes third and fourth plies 7c and 7d having fibers oriented at ±β, where β is between 15 and 85 degrees (e.g., ±40, ±50, ±60, ±70, ±80). In some embodiments, the range for β will be narrower, between 50 and 75 degrees. Fibers oriented at ±β degrees boost shear, transverse and bearing strength. For instance, fibers oriented at ±β degrees can be added to boost bearing strength in areas where fasteners are used to make a fastened joint or repair a joint. Since fewer ±β plies are needed to achieve same transverse strength and bearing (that is, relative to fibers oriented at 90 degrees, +45 degrees and −45 degrees), the resulting article is more usable, tailorable, efficient and lighter.

Selective fiber orientation allows any of six characteristics to be adjusted: strength in shear, stiffness in shear, strength in transverse, stiffness in transverse, bearing strength, and bearing stiffness. If greater strength in shear is desired, a β approaching 40 or 50 degrees will be selected. If greater strength in transverse is desired, a β approaching 85 degrees will be selected. If greater strength in bearing is desired, a β approaching 65-70 degrees will be selected.

Of the total fibers oriented at ±α and ±β, only 20-30% of the total fibers at ±β are needed to reach bearing strength levels similar to traditional 0/+45/−45/90 degree hard laminates. However, unlike traditional hard laminates, where the percentage of zero degree plies is between 40 and 100%, ply splitting will be suppressed or delayed if fibers in the article are cut and loaded.

In some embodiments, plies of the fibers oriented at ±β degrees may be interspersed with plies of the fibers oriented at ±α. Consider an example of unidirectional plies that are interspersed. The plies may have the following order: +α/−α/+β/+α/−α/−β/+α/−α/ . . . .

The article 6 of FIG. 1 may be machined. As a first example, a hole is drilled into the article 6. The hole 6 cuts through a plurality of fibers. As a second example, an end of the article 6 is saw cut. The saw cut exposes the ends of a plurality of fibers.

As mentioned above, fasteners extend through the holes and fasten the reinforcement plates 8 and 9 to the beam chord 7. Examples of fasteners include bolts, staples, z-pins, and barbs. Fasteners such as bolts extend entirely through the beam chord 7. Fasteners such as staples, z-pins and barbs may extend partially into the beam chord 7. Fasteners such as staples, z-pins and barbs may be integral with the reinforcement plates 8 and 9.

Another example of a fastener is stitching. Stitches can be threaded through holes in a layup of dry composite plies and reinforcement plates. Resin is then infused in the article, and the article is cured.

Figure 4:
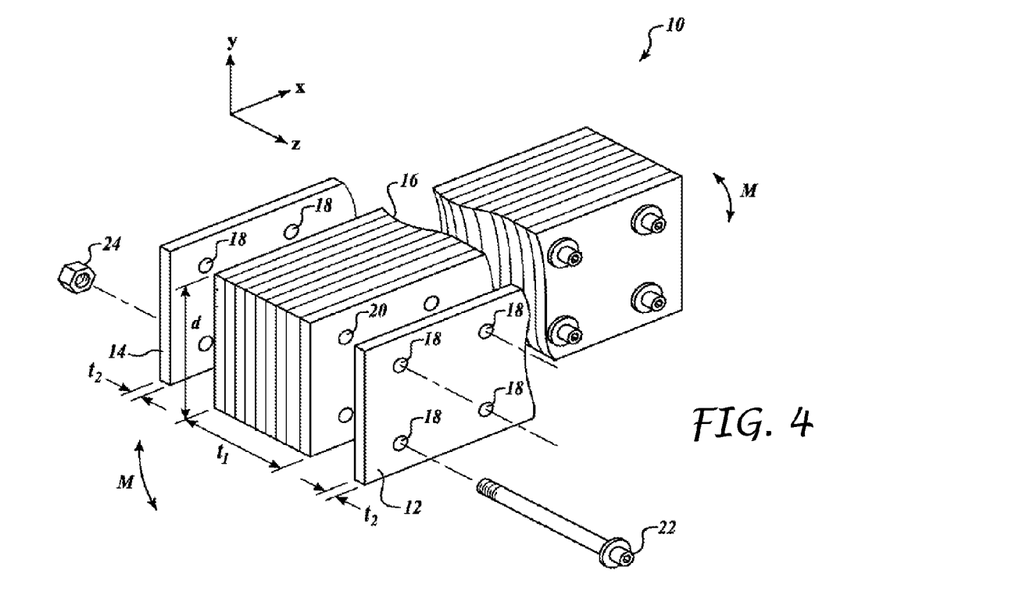
FIG. 4 is a partial exploded isometric view of a beam assembly that is fastened together by bolts.

FIG. 4 illustrates a beam assembly 10 including first and second reinforcement members 12 and 14 that are bolted to opposite sides of a central structural member 16. The first and second reinforcement members 12 and 14 and the central structural member 16 extend in the x-direction to a comparable length.

The central structural member 16 includes a stack of flat, elongated beam chords. The central structural member 16 has a predetermined depth d and thickness $t_1$ that is suitably dimensioned to resist an anticipated bending moment M, having an axis of orientation approximately directed in a z-direction. Each beam chord in the stack includes multiple plies of reinforcing fibers in a polymer matrix. The fibers in at least some of the plies have an orientation of ±α degrees relative to the x-axis. The reinforcing fibers may include, for example, glass fibers, aramid fibers, boron fibers, alumina fibers and silicon carbide fibers. In one particular embodiment, however, the reinforced polymer-based material includes a plurality of carbon fibers that are embedded in a high performance epoxy compound to impart a high structural stiffness to the structural member 10. In other embodiments, the discrete plies of the central structural member 16 may be stitched together. Alternately, staples may be used to couple the discrete plies together.

The beam assembly 10 has a plurality of apertures 18 that extend through the reinforcement members 12 and 14 and the central structural member 16. The apertures 18 and 20 are suitably sized to accommodate a plurality of bolts 22. A predetermined torque is imparted to the bolts 22 and corresponding nut portions 24 to cooperatively impart a predetermined compressive force in a z-direction to the central structural member 16. The reinforcement members 12 and 14 distribute the compressive force. In some embodiments, the bolts 22 may be tightened to 40-60% of maximum bolt tension.

Figure 5:
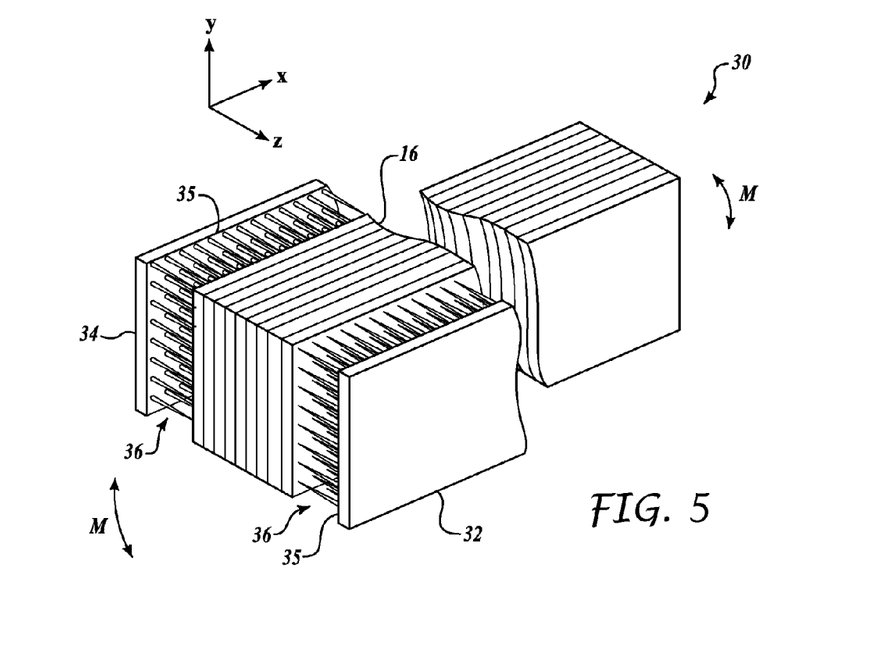
FIG. 5 is a partial exploded isometric view of a beam assembly that is reinforced by z-pins.

FIG. 5 illustrates a beam assembly 30 including first and second reinforcement members 32 and 34 and a plurality of z-pin members 36 extending outwardly from respective contacting surfaces 35 of the first and second reinforcement members 32 and 34. In one particular embodiment, the z-pin members 36 are embedded into the central structural member 16 by exciting the z-pin members 36 with ultrasound energy as the members 34 are impressed into the central structural member 16, as described in detail in U.S. Pat. No. 4,808,461 to Boyce, et al. and entitled "Composite Structure Reinforcement." In addition to the z-pin members 36 other fasteners (not shown in FIG. 5) that project through the members 16, 32 and 34 may be used to provide additional reinforcement at selected portions of the beam assembly 30 and/or to permit the beam assembly 30 to be coupled to other external structures.

A beam assembly can be formed from a single beam chord or multiple beam chords. A beam assembly formed from multiple beam chords is illustrated in FIGS. 6 and 7.

Figure 6:
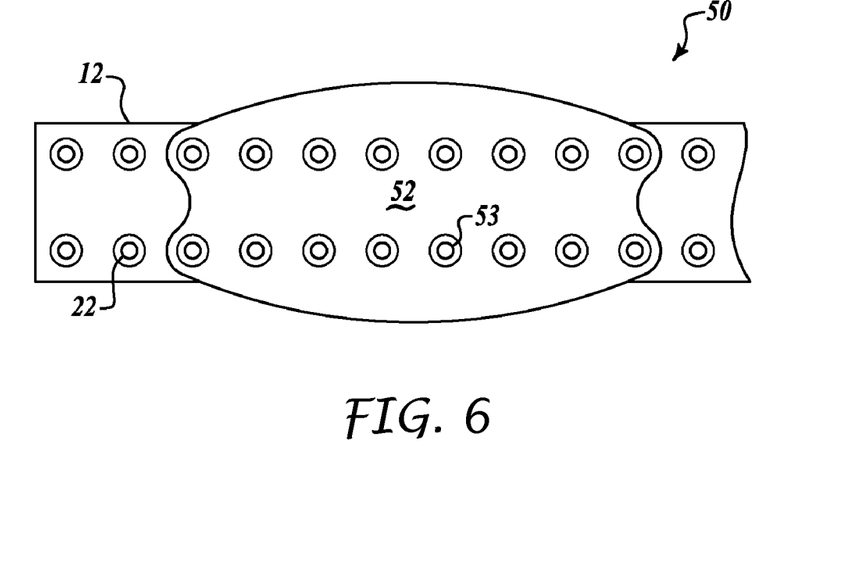
FIG. 6 is side view of a beam chord splice.
Figure 7:
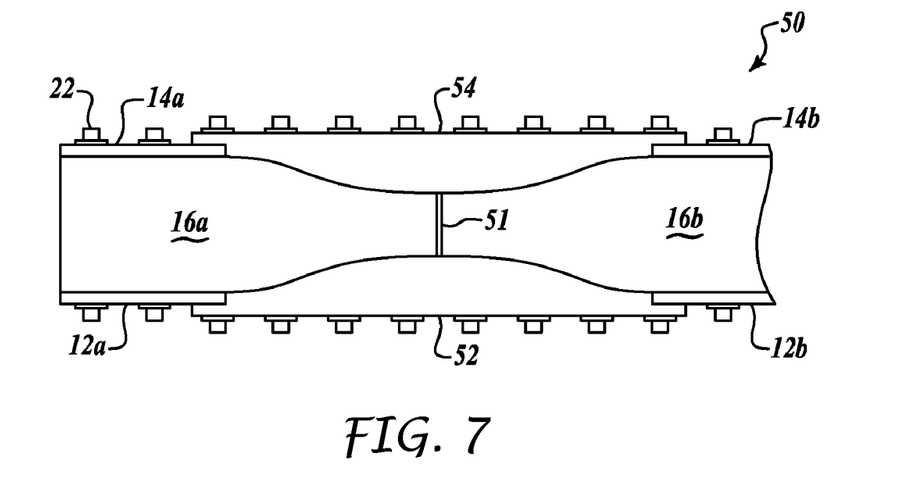
FIG. 7 is a top view of the beam chord splice of FIG. 6.

Reference is now made to FIGS. 6 and 7, which illustrate a beam assembly 50 including a first central structural chord 16a and a second central structural chord 16b that are spliced together. Each chord 16a and 16b includes plies of reinforcing fibers oriented at ±α0 degrees relative to the segment's longitudinal axis. The first central structural chord 16a is clamped between first and second reinforcement plates 12a and 14a. The second central structural chord 16b is clamped between first and second reinforcement plates 12b and 14b. A first splicing plate 52 is positioned on the first reinforcement plates 12a and 12b. Apertures 53 in the first splicing plate 52 are aligned with through holes in the central structural chords 16a and 16b as well as apertures in the reinforcement plates 12a and 12b. A second splicing plate 54 is correspondingly positioned on the second reinforcement plates 14a and 14b. Apertures 53 in the second splicing plate 54 are in alignment with through holes in the central structural chords 16a and 16b and apertures in the reinforcement plates 12a and 12b. Bolts 22 may be inserted through the first splicing plate 52 and the second splicing plate 54, and secured by nut portions 24, so that the chords 16a and 16b are spliced together. A taper block 51 may be positioned at the interface between the spliced segments 16a and 16b in order to provide integrity to the interface. The taper block 51 and splicing plates 52 and 54 may be made of metal or carbon graphite.

Figure 8:
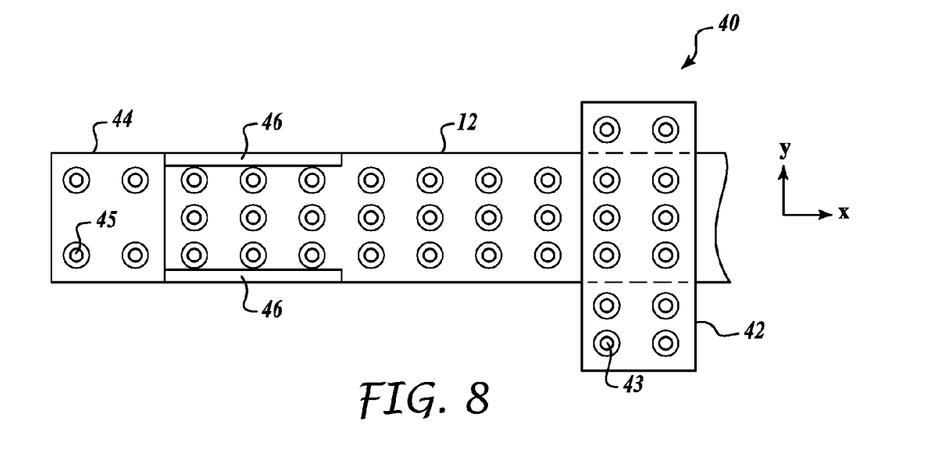
FIG. 8 is a partial elevation view of a structural or system joint.
Figure 9:
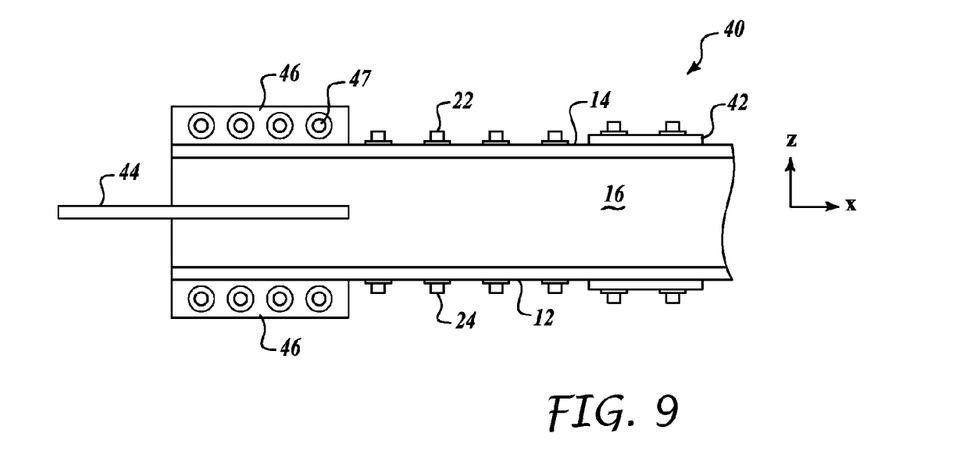
FIG. 9 is a partial plan view of the structural or system joint of FIG. 8.

Reference is now made to FIGS. 8 and 9, which illustrates a structural or system joint including attachment plates 42, 44 and 46 for connecting a beam assembly 40 to other structures. A transverse attachment plate 42 is positioned between the beam chord 16 and either the first or second reinforcement plate 12 or 14 by forming a receiving lateral cutout portion in the beam chord 16. The transverse attachment plate 42 is secured to the beam chord 16 by fasteners 22 that project through the beam chord 16 and the second reinforcement member 14. Alternately the transverse attachment plate 42 may be secured to an exterior surface of either the first or second reinforcement plate 12 or 14 so that a receiving cutout portion in the beam chord 16 is not required.

A longitudinal attachment plate 44 is positioned within a longitudinal cutout portion that extends inwardly from an end portion of the beam assembly 40. The longitudinal attachment plate 44 is similarly coupled to the composite beam by the fasteners 22, which extend through the beam chord 16.

An attachment plate 46 is an angled attachment plate 46 that is positioned between the beam chord 16 and the first or second reinforcement plate 12 or 14 by forming a receiving lateral cutout portion in the beam chord 16. The angled attachment plate 46 may be to the beam 40 by fasteners 22 that extend through the beam 40. Alternately the angled attachment plate 46 may be coupled to an exterior surface of either the first or second reinforcement plate 12 or 14 so that a receiving cutout portion in the beam chord 16 is not necessary.

The attachment plates 42, 44 and 46 may also include apertures 43, 45 and 47, respectively. These apertures 43, 45 and 47 may be used to couple the beam assembly 40 to other external structural portions.

An article herein is not limited to any particular application. Examples of applications include, but are not limited to various structures in aerospace vehicles, blades of windmills and wind turbines, gear box shafts, and transmission and power shafts for automobiles and other machines. Within aerospace vehicles, beams herein may be used for keel beams, landing struts, wing spars, and fuel conduits. An example of an aerospace vehicle is illustrated in FIG. 10.

Figure 10:
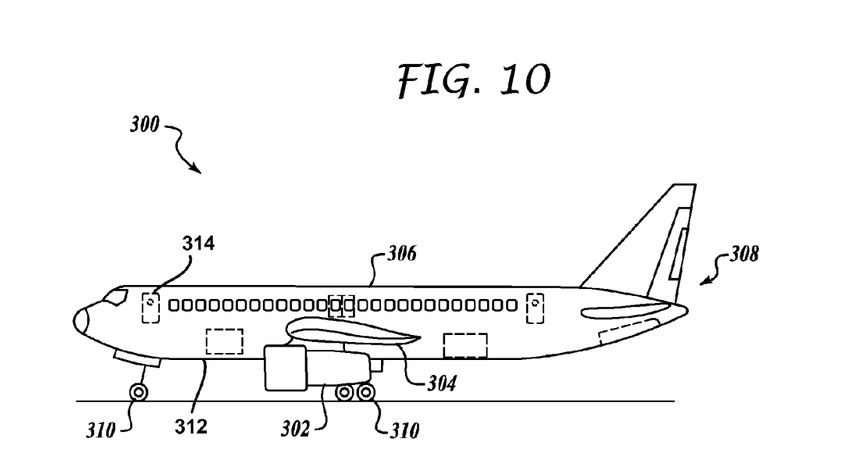
FIG. 10 is an illustration of an aircraft that incorporates one or more composite beam chords sandwiched between reinforcement plates.

Reference is now made to FIG. 10, which illustrates an aircraft 300. The aircraft 300 generally includes a fuselage 306, wing assemblies 304, and empennage 308. One or more propulsion units 302 are coupled to the wing assemblies 304, or fuselage 306 or other portions of the aircraft 300. A landing assembly 310 is coupled to the fuselage 306.

The fuselage 306 includes one or more keel beams (e.g., a fore keel beam and an aft keel beam), which are longitudinally oriented structural members that impart flexural stiffness to the fuselage, particularly where the landing gear is located and where the wing assemblies of the aircraft are joined to the fuselage. The keel beam in located generally at 312.

The keel beam may have a single beam chord or it may have multiple (e.g., three) beam chords that are spliced together. For example, the splicing plates 52 and 54 may be used to splice the keel beam chords together. The tapered block 51 may be tapped into the space between the keel beam chords, picking up any gaps remaining due to manufacturing tolerances. The keel beam may be connected to other aircraft frame members using connection plates such as those illustrated in FIGS. 8 and 9.

Each beam chord is clamped between reinforcement plates. The reinforcement plates offer benefits in addition to providing protection against impact damage, improving load transference properties, increasing strength in compression, and suppressing delamination. The reinforcement plates provide a path for lighting. The lighting path is especially valuable for a fuselage 306 made primarily of composite material.

The reinforcement plates also provide a ground plane for electronic equipment. If the keel beam is provided with a grid of apertures, the grid could be used to secure many different pieces of equipment to the keel beam.

Substantial weight savings can be realized by using a keel beam including a composite beam chord clamped between reinforcement plates. Such a keel beam weighs 50% less than a keel beam fabricated from aluminum or titanium. In addition, the combination of the α-oriented fibers and the bolt clamping yields a beam chord that is about twice as strong in compression upon impact as a traditional composite beam.

The aircraft 300 could use articles herein for structures other than keel beams. For instance, articles herein could be used as a frame doubler ring around passenger and cargo doors 314. The reinforcement plates would provide added protection against impacts from passenger and cargo loaders Articles herein could be used as stringers in the fuselage 306, wing assemblies 304 and empennage 308. Beams herein could be used as struts in the landing assembly 310.

Figure 11:
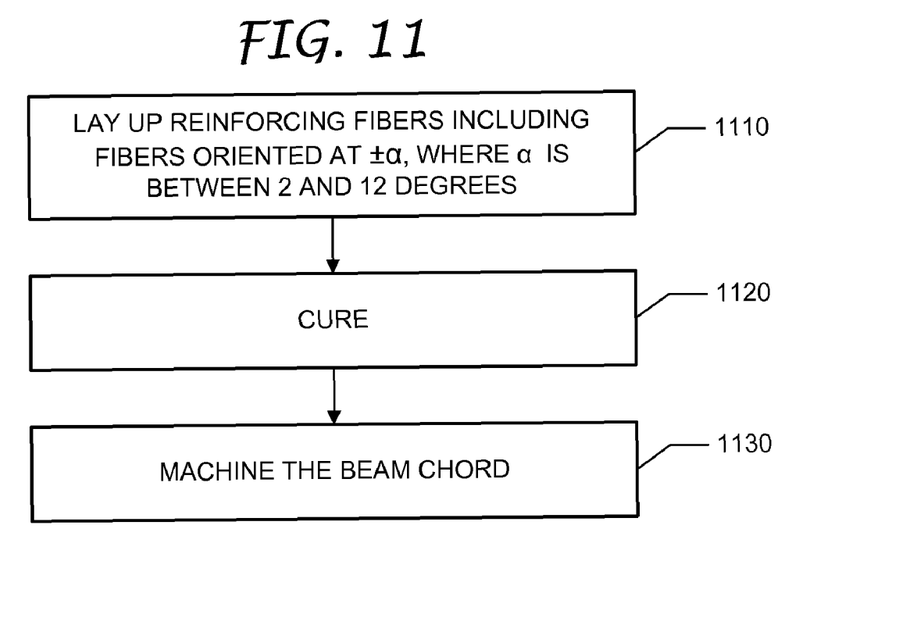
FIG. 11 is an illustration of a method of fabricating a composite beam chord.

Reference is now made to FIG. 11, which illustrates a method of manufacturing a composite beam chord. At block 1110, a first drill breakout ply (e.g., a first cloth) is placed on a tool (e.g., mandrel or mold tool), plies of reinforcing fibers are laid up on the cloth, and a second drill breakout ply (e.g., a second cloth) is placed on the top ply. Fibers in at least some of the plies have an orientation of $\pm\alpha$ degrees with respect to the longitudinal axis, where $\alpha=2$ to 12 degrees and preferably 3 to 5 degrees. The lay-up may also include laying up plies of fibers at other angles, such as $+\beta$ and $-\beta$ degrees.

As a first example, only plies of fibers at $\pm\alpha$ degrees are laid up. As a second example, one or more plies at $\pm\alpha$ and $\pm\beta$ degrees may be laid up. Of the total fibers oriented at $\pm\alpha$ and $\pm\beta$ degrees, only 20% of fibers at $\pm\beta$ degrees may be used to reach bearing strength levels similar to traditional 0/45/90 degree plies in the lengthwise direction. More generally, 0% to 40% of all reinforcing fibers in the beam may be oriented $\pm\beta$ degrees.

In some embodiments, each ply may be a unidirectional tape with fibers oriented at $\pm\alpha$ degrees with respect to a longitudinal axis of the tape. These tapes are dispensed on the tool and rotated to the correct angle (e.g., $+\alpha$). As a result, some of the tape may overhang the tools. The overhanging portions can eventually be cut off (for instance, after curing).

In other embodiments, "cartridges" may be laid up. Cartridges may include pre-packaged plies having the correct fiber orientation (e.g., $+\alpha$ and $-\alpha$) with respect to the cartridge's longitudinal axis. Such cartridges can be dispensed on the tool without overhang. For example, the cartridge can be dispensed with its longitudinal axis parallel to the longitudinal axis of the tool.

In some embodiments, a cartridge may include two plies that are stitched together. One ply may have fibers oriented at $+\alpha$ degrees and the other ply may have fibers oriented at $-\alpha$ degrees. Both plies have the correct fiber orientation with respect to the cartridge's longitudinal axis.

The fibers may be balanced or slightly unbalanced. As an example of balanced fibers, an article has N plies of fibers at $+\alpha$ interspersed with N plies of fibers at $-\alpha$. As an example of slightly unbalanced fibers, an article may have N plies of fibers at $+\alpha$ interspersed with N$-$1 plies of fibers at $-\alpha$ degrees.

In some embodiments, all plies may have the same value of $+\alpha$ and the same value of $-\alpha$. In other embodiments, the fibers may have different values of α. For instance, plies of reinforcing fibers having orientations of α=3 degrees and α=5 degrees may be laid up.

In some embodiments, a ply may have fibers at different angles. For example, a ply may include fibers oriented at angles of −3 degrees, +7 degrees, −7 degrees, and +2 degrees.

In some embodiments, a weave may be dispensed instead of unidirectional tape. Unlike tapes, which have no crimp, the fibers in weaves are crimped. And unlike tapes, a single weave can have fibers oriented at +α degrees and fibers oriented at −α degrees.

At block 1120, the layup is cured. A matrix (e.g., a thermoplastic or thermoset) can be added before, after or while the plies are either laid up or being cured.

At block 1130, the cured beam chord is machined. For example, fastener holes or other types of holes may be drilled into the cured beam chord. The holes may be drilled while the article is on the tool, or after the beam chord has been removed from the tool. The holes may be roughly perpendicular to the plies. The drill breakout plies prevent the fibers in the surface plies from peeling away.

Figure 12:
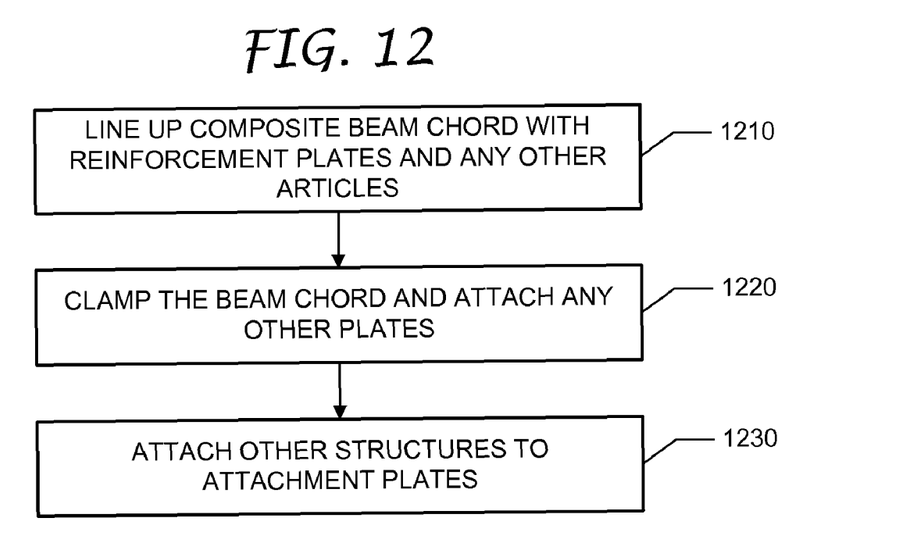
FIG. 12 is an illustration of a method of assembling an article including a composite beam chord and reinforcement plates.

Reference is now made to FIG. 12, which illustrates a method of assembling at least one composite beam chord. At block 1210, holes in the beam chord are lined up with reinforcement plates and any other plates (e.g., splice plates and attachment plates). At block 1220, fasteners are inserted through holes, and the beam chord is clamped between the reinforcement plates. Other plates are also attached. At block 1230, other structures (e.g., beams, devices) are secured to the attachment plates.

The invention claimed is:

1. An article comprising a composite beam chord between first and second reinforcement plates, the beam chord including a first ply of reinforcing fibers with a fiber orientation of +α degrees with respect to a longitudinal axis of the beam and a second ply of reinforcing fibers with a fiber orientation of −α degrees with respect to the longitudinal axis, where α=2 to 12 degrees.

2. The article of claim 1, wherein α=2 to 8 degrees.

3. The article of claim 1, wherein α=3 to 5 degrees.

4. The article of claim 1, wherein α=3 degrees.

5. The article of claim 1, wherein the number of reinforcing fibers oriented at ±α degrees is at least 60% of the total number of reinforcing fibers in the composite beam chord.

6. The article of claim 1, wherein the composite beam chord includes carbon fibers in a polymer matrix.

7. The article of claim 1, wherein the beam further includes third and fourth plies of reinforcing fibers oriented at ±β degrees with respect to the longitudinal axis, where β is between 15 and 85 degrees.

8. The article of claim 7, wherein β is between 50 and 75 degrees.

9. The article of claim 7, wherein 0% to 40% of all fibers in the beam chord are oriented at ±β degrees.

10. The article of claim 1, wherein the plies extend in an x-y plane, wherein holes are drilled through the beam in a z-direction; and wherein fasteners extend through the holes to clamp the plates to the beam chord.

11. The article of claim 1, wherein at least one of the first and second reinforcement plates includes a plurality of z-pin members extending into a respective first side and second side of the beam chord.

12. The article of claim 1, wherein the plates are metal plates.

13. The article of claim 1, wherein the article is an aircraft keel beam.

14. The article of claim 1, wherein the beam chord consists of a matrix and reinforcing fibers oriented at ±α degrees.

15. The article of claim 1 further comprising at least one attachment plate positioned between the beam chord and at least one of the first and second reinforcement plates, the attachment plate including a plurality of apertures for attaching to external structures.

16. A beam assembly comprising a first article according to claim 1; a second article according to claim 1; a splicing plate for splicing the first and second articles together; and a plurality of fasteners extending through the splicing plate and the articles.

17. An aerospace vehicle, comprising:
a fuselage;
wing assemblies and an empennage coupled to the fuselage; and
an article of claim 1 in at least one of the wing assemblies, the fuselage and the empennage.

18. The vehicle of claim 17, wherein the fuselage includes a keel beam, the keel beam including the article of claim 1.

19. An article comprising first and second metal reinforcement plates, a composite beam chord between the first and second plates, and a plurality of fasteners extending through the beam chord for clamping the first and second plates to the beam chord, the beam chord including a first ply of reinforcing fibers with a fiber orientation of +α degrees with respect to a longitudinal axis of the beam chord and a second ply of reinforcing fibers with a fiber orientation of −α degrees with respect to the longitudinal axis, where α=2 to 12 degrees, the fasteners perpendicular to the plies.

20. The article of claim 19, wherein α=3 to 5 degrees.

21. A method of manufacturing an article, the method comprising:
fabricating a composite beam chord, including laying up plies of reinforcing fibers on a tool, wherein the fibers in at least some of the plies have an orientation of ±α with respect to a uni-axial load bearing direction of the article, where α=2 to 12 degrees;
forming through holes in the composite beam chord; and
using the through holes to fasten reinforcement plates to opposite sides of the beam chord.

22. The method of claim 21, wherein α=3 to 5 degrees.

* * * * *